Sept. 30, 1969  E. COZZARIN ET AL  3,469,468
COMPOSITE DRIVE WHEEL
Filed Oct. 30, 1967

INVENTORS.
EDWARD COZZARIN
WILLIAM T. PAUL
EMERY NEMETH
BY Evan D. Roberts
ATTORNEY.

United States Patent Office 3,469,468
Patented Sept. 30, 1969

3,469,468
COMPOSITE DRIVE WHEEL
Edward Cozzarin, Ithaca, Emery Nemeth, Trumansburg, and William T. Paul, Ithaca, N.Y., assignors, by mesne assignments, to Borg-Warner Corporation, Chicago, Ill., a corporation of Delaware
Filed Oct. 30, 1967, Ser. No. 678,801
Int. Cl. F16h 55/30, 55/12
U.S. Cl. 74—243                          3 Claims

ABSTRACT OF THE DISCLOSURE

Composite drive wheel devices are disclosed herein to provide illustrations of this invention. These wheels include stamped circular plates having tooth roots on the periphery thereof with a plastic toothed rim molded over the tooth roots.

SUMMARY OF THE INVENTION

This invention relates to a composite drive wheel device wherein a flange is provided on a stamped wheel plate body. The flange has an inner portion extending at an angle with respect to the plane of the plate body, and an outer peripheral portion extending at an angle with respect to the plane of said body. The outer peripheral portion is corrugated to provide peripheral tooth roots over which a toothed plastic rim is molded with the teeth thereof in respective complemental relationship with the corrugated teeth in the outer flange portion.

Other advantages and novel aspects of the invention will become apparent upon the following detailed description, in conjunction with the accompanying drawing wherein.

Figure 1:
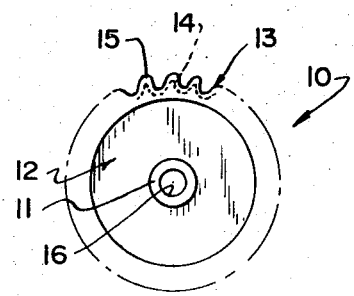
FIG. 1 is a general illustrative representation of the composite drive wheel device of this invention, showing a stamped plate with an outer peripheral corrugated flanged portion over which a plastic toothed drive rim is molded.

A composite drive wheel generally designated by the numeral 10 (FIG. 1) is shown for the purpose of broadly illustrating and describing the embodiments of this invention. The composite wheel 10 includes generally, among other things, a hub 11, a stamped plate body 12, a flange 13, tooth roots 14 and a plastic toothed rim 15. The hub 11 is secured to the stamped plate body 12, and is adapted with aperture 16 to drivingly receive a drive or driven shaft.

Figure 2:
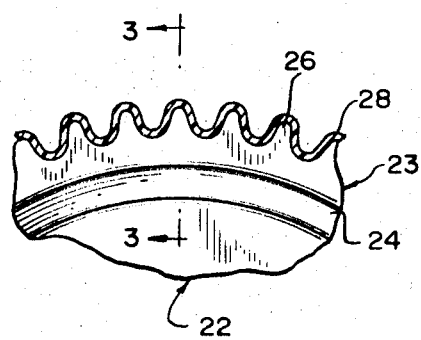
FIG. 2 is a partial axial view of a first embodiment of the composite drive wheel device of this invention showing the configuration of the tooth roots thereof.
Figure 3:
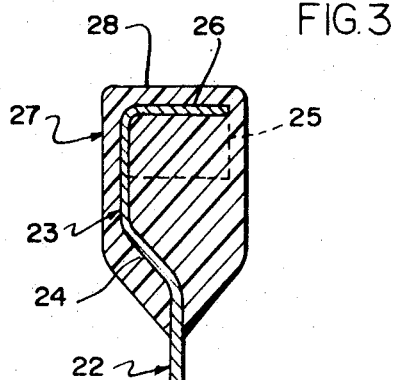
FIG. 3 is a partial sectional view taken along line 3—3 of FIG. 2 showing the configuration of the flanged portions of the composite drive wheel device of this invention shown in FIG. 2.

In the first embodiment of this invention (FIGS. 2 and 3), a stamped plate body 22 is provided with a flange generally designated by the numeral 23. The flange 23 has an inner flange portion 24 extending at an angle with respect to the plane of the plate 22, and an outer flange portion 25 extending through the plane of the plate 22. The outer flange portion 25 is formed in a corrugated fashion to provide radially extending tooth roots 26. A plastic toothed rim 27 is molded over the tooth roots 26 and the entire flange 23, and is provided with teeth 28 which are respectively substantially complemental with respect to the tooth roots 26.

Figure 4:
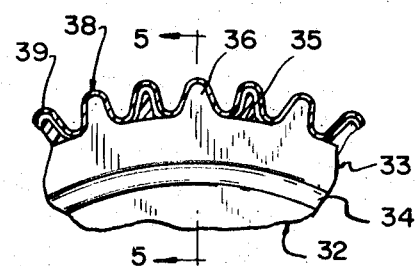
FIG. 4 is a partial axial view of a second embodiment of the composite drive wheel device of this invention showing the configuration and interposition of the tooth roots thereof.
Figure 5:
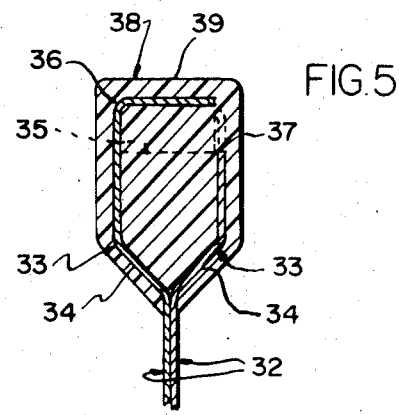
FIG. 5 is a partial sectional view taken along line 5—5 of FIG. 4 showing the double plate body with the flanged and corrugated tooth portions thereof.
Figure 6:
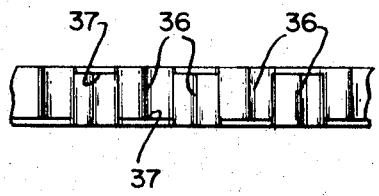
FIG. 6 is a partial peripheral view of the second embodiment of the invention shown in FIG. 4 showing the interposition of the corrugations of the two plate bodies providing a series of peripheral tooth roots.

In the second embodiment of this invention (FIGS. 4, 5 and 6), a pair of identical stamped plate bodies 32 are each provided with a flange generally designated by the numeral 33. The flange 33 has an inner flange portion 34 extending at an angle with respect to the plane of the plate 32 and an outer flange portion 35 extending through the plane of the plate 32. The outer flange portion 35 of each of the plate bodies 32 is formed in a corrugated fashion to provide radially extending tooth roots 36.

A space 37 is provided in the outer flange 35 of each of the plate bodies 32 in lieu of alternate tooth roots 36 thereof. The plates 32 are substantially identical and are secured together in concentric relation with the alternate teeth of one plate 32 positioned in the space 37 of the other plate 32 to provide the tooth roots 36 in a peripheral series on the plates 32. A plastic toothed rim 38 is molded over the tooth roots 36 and the flange 33, and is provided with teeth 39 which are respectively substantially complemental with respect to the tooth roots 36.

Figure 7:
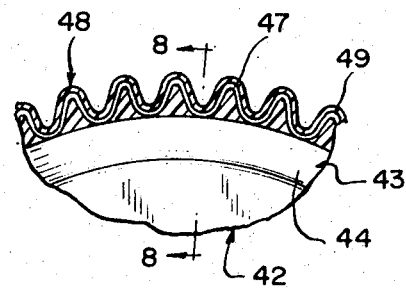
FIG. 7 is a partial axial view of a third embodiment of this invention showing the configuration of the corrugated tooth roots thereof.
Figure 8:
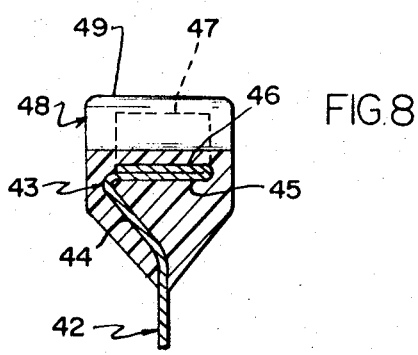
FIG. 8 is a partial sectional view taken along line 8—8 of FIG. 7 showing the configuration of the double outer flange portion and the corrugated tooth roots formed with respect thereto.

In the third embodiment of this invention (FIGS. 7 and 8), a stamped plate body 42 is provided with a flange generally designated by the numeral 43. The flange 43 has an inner flange portion 44 extending in an angle with respect to the plane of the plate 42, third flange portion 45 extending through the plane of the plate 42 and a second flange portion 46 extending from the third flange portion 45 in a manner parallel and in engagement with the third flanged portion. The outer flange portion 46 is formed in a corrugated fashion to provide radially extending tooth roots 47. A plastic toothed rim 48 is molded over the tooth roots 47 and the flange 43 generally, and is provided with teeth 49 which are respectively substantially complemental with respect to the tooth roots 47.

It is to be understood that the invention is not to be limited to the specific constructions and arrangements shown and described, as it will be understood to those skilled in the art that changes may be made without departing from the principles of the invention.

What is claimed is:
1. A composite drive wheel device comprising a drive wheel plate having a flanged periphery, said flanged periphery having a first inner portion extending at an acute angle from the plane of said plate, said flanged periphery having a second outer portion extending through the plane of said plate, said flanged outer portion being corrugated to provide tooth roots, and a plastic tooth rim secured on said flanged periphery with the teeth thereof respectively complementally positioned over said tooth roots.

2. A composite drive wheel device as defined in claim 1 wherein an opening is provided in the outer flanged portion in lieu of every other corrugation and said drive wheel plate is secured substantially concentrically with an identical drive wheel plate with the corrugated portions of each drive wheel plate alternately positioned in the flange openings of the other drive wheel plate to provide a series of peripheral tooth roots.

3. A composite drive wheel device as defined in claim 1 wherein said flanged periphery includes a third portion extending through the plane of said plate and interconnecting said first portion with said second portion.

References Cited

UNITED STATES PATENTS

| | | | |
|---|---|---|---|
| 2,724,975 | 11/1955 | Drummond | 74—243 XR |
| 2,729,110 | 1/1956 | Killian et al. | 74—243 XR |
| 3,076,352 | 2/1963 | Larsh | 744—443 |

OTHER REFERENCES

German printed application, 1,129,024, Kallhardt, May 1962.

FRED C. MATTERN, JR., Primary Examiner
JAMES A. WONG, Assistant Examiner

U.S. Cl. X.R.

74—439